(12) United States Patent
Shirokoshi

(10) Patent No.: US 7,059,996 B2
(45) Date of Patent: Jun. 13, 2006

(54) PLANETARY GEAR DRIVE

(75) Inventor: Norio Shirokoshi, Minamiazumi-gun (JP)

(73) Assignee: Harmonic Drive Systems Inc., Tokyo (JP)

( * ) Notice: Subject to any disclaimer, the term of this patent is extended or adjusted under 35 U.S.C. 154(b) by 180 days.

(21) Appl. No.: 10/870,153

(22) Filed: Jun. 18, 2004

(65) Prior Publication Data

US 2004/0259677 A1 Dec. 23, 2004

(30) Foreign Application Priority Data

Jun. 20, 2003 (JP) .............................. 2003-175940

(51) Int. Cl.
*F16H 57/08* (2006.01)

(52) U.S. Cl. ...................... 475/347; 475/317; 475/331; 475/346

(58) Field of Classification Search ................ 475/317, 475/346, 331, 330, 347; 74/640
See application file for complete search history.

(56) References Cited

U.S. PATENT DOCUMENTS

| | | | | |
|---|---|---|---|---|
| 5,879,261 A | * | 3/1999 | Bayer | 475/219 |
| 6,290,625 B1 | * | 9/2001 | Shirokoshi | 475/347 |
| 6,719,658 B1 | * | 4/2004 | Haga et al. | 475/163 |

FOREIGN PATENT DOCUMENTS

| | | | |
|---|---|---|---|
| JP | 08061438 A | * | 3/1996 |
| JP | 2000-179629 | | 6/2000 |

* cited by examiner

*Primary Examiner*—Sherry Estremsky
*Assistant Examiner*—Tara L. Bolton
(74) *Attorney, Agent, or Firm*—Buchanan Ingersoll PC

(57) ABSTRACT

A planetary gear drive includes a thin, elastically resilient internal gear arranged within an annular housing, in which there is also a carrier that is rotatably supported by a pair of tapered roller bearings. A sun gear located concentrically within a cylindrical portion of the carrier is arranged so that the sun gear is capable of floating movement perpendicular to the drive axis. Any uneven meshing caused by error in the assembly or manufacture of the gears is automatically cancelled by radial elastic deformation of the internal gear and the floating movement of the sun gear, reducing backlash. Moreover, the use of two tapered roller bearings makes it possible to increase the moment capacity of the planetary gear drive.

7 Claims, 3 Drawing Sheets

PLANETARY GEAR DRIVE

BACKGROUND OF THE INVENTION

1. Field of the Invention

The present invention relates to a planetary gear drive for applications requiring low backlash and high moment capacity.

2. Description of the Prior Art

Examples of low-backlash planetary gear drives include the one described in JP-A 2000-179629. That described a planetary gear drive provided with a thin, elastically resilient internal gear in which the backlash is reduced to 3 to 1 minutes without a backlash adjustment mechanism by means of the elastic deformation of the thin, resilient internal gear. An advantage of the planetary gear drive having the configuration described in the above disclosure is that it enables a compact drive configuration with low backlash and high torque capacity. However, it does not have a sufficient moment capacity for applications that require a high moment capacity.

SUMMARY OF THE INVENTION

In view of the above drawbacks of the prior art, an object of the present invention is to provide a planetary gear drive that has low backlash and a high moment capacity.

To attain this object, the present invention provides a planetary gear drive comprising an internal gear, a sun gear disposed concentrically within the internal gear, at least one planetary gear in meshed engagement with the internal gear and sun gear, a carrier that rotatably supports the planetary gear, a housing that houses the above gears and carrier, an input-side tapered roller bearing and an output-side tapered roller bearing attached to an inner peripheral surface of the housing, said tapered roller bearings being positioned along a driver axis at each end of the internal gear, the carrier having an output-side disc-shaped end plate portion, and a cylindrical portion extending to an input side from the output-side disc-shaped end plate portion, the disc-shaped end plate portion of the carrier being rotatably supported on an inner peripheral surface of the housing by means of the output-side tapered roller bearing, and the input-side portion of the cylindrical portion of the carrier being rotatably supported on an outer peripheral surface of the housing by means of the input-side tapered roller bearing, the sun gear being inserted concentrically into the cylindrical portion from the input side, the internal gear being a thin, elastically resilient internal gear capable of radial elastic deformation, the sun gear being incorporated in a floating state that enables it to move perpendicularly to the drive axis.

In the planetary gear drive of this invention, the internal gear is a thin, elastically resilient gear and the sun gear is incorporated in a floating state, so that any meshing error arising from gear assembly error can be cancelled by elastic deformation of the internal gear and radial movement of the sun gear, and it is possible to reduce uneven load distribution and rotational unevenness arising in cases in which backlash is reduced. Moreover, the carrier is supported by tapered roller bearings on both the input side and the output side, which enables the moment capacity of the planetary gear drive to be increased. Thus, it is possible to realize a planetary gear drive having a high moment capacity and low backlash.

The internal gear can be composed of an annular flange affixed to the housing, a thin, cylindrical portion extending from the flange to an output side, and internal teeth formed on an inner peripheral surface of the thin, cylindrical portion. In this case, an annular space can be formed between the outer peripheral surface of the cylindrical portion and the inner peripheral surface of the housing to permit outward radial elastic deformation of the cylindrical portion.

The housing can be configured as an input-side cylindrical housing and an output-side cylindrical housing. In this case, the flange of the internal gear can be disposed between the input and output housings and the three members affixed concentrically together.

The output-side of the planetary gear drive can be composed of an annular flange affixed concentrically on the output end of the housing, an output member connected concentrically to the output end of the disc-shaped end-plate portion of the carrier, and an oil seal disposed between the flange and the output member. The output member can be a round output shaft, a pinion or a disc-shaped flange. A seal can be included between the flange and the output-side member to prevent the intrusion of foreign matter from the outside.

When the planetary gear drive is to be used as a two-stage planetary gear drive, the first-stage planetary gear mechanism can be located in the input side of the cylindrical portion of the carrier. The first-stage planetary gear mechanism can be comprised of a first-stage internal gear formed on an inner peripheral surface of the cylindrical portion, a first-stage carrier attached to a shank extending concentrically from an input end of the sun gear, a first-stage planetary gear rotatably supported by the first-stage carrier, and a first-stage sun gear disposed concentrically on the input-side shank of the sun gear, with the first-stage sun gear able to float perpendicularly to the drive axis.

Further features of the invention, its nature and various advantages will be more apparent from the accompanying drawings and following detailed description of the invention.

DESCRIPTION OF THE PREFERRED EMBODIMENTS

Figure 1:
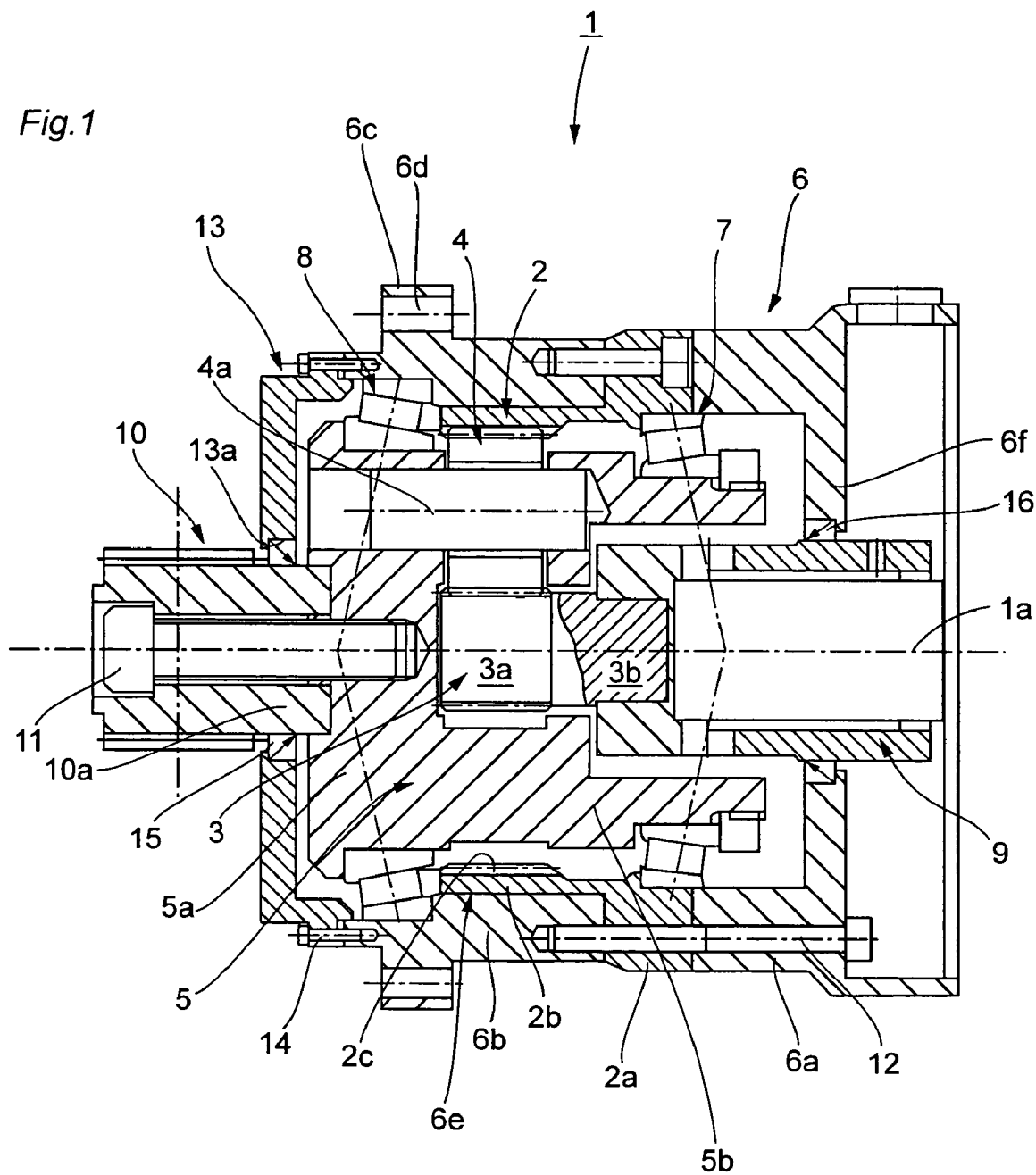
FIG. 1 is a longitudinal sectional view of a planetary gear drive according to a first embodiment of the invention.

FIG. 1 is a longitudinal sectional view of a planetary gear drive according to a first embodiment of the invention, applied to a single reduction gear. The planetary gear drive 1 includes an internal gear 2, a sun gear 3 disposed concentrically inside the internal gear 2, a plurality of planetary gears 4 in meshing engagement with the internal gear 2 and the sun gear 3, a carrier 5 that rotatably supports the planetary gears 4, and a housing 6 that houses these parts. The carrier 5 is rotatably supported on the inner peripheral surface of the housing 6 via a tapered roller bearing 7 and a tapered roller bearing 8 attached to the inner peripheral surface of the housing 6. A coupling 9 located concentrically on the input side of the sun gear 3 connects the sun gear 3 to a rotation input shaft (not shown) such as a motor output shaft. A pinion 10 constituting an output member is affixed by a fixing bolt 11 concentrically to the output end of the carrier 5.

Details of each part will now be explained. The housing 6 comprises an input-side cylindrical housing 6a and an output-side cylindrical housing 6b, between which is the internal gear 2. The internal gear 2 is a thin, elastically resilient internal gear capable of being radially elastically deformed, comprising an annular flange 2a, a thin, cylindrical portion 2b extending from the output side of the flange 2a, and internal teeth 2c formed on the inner peripheral surface of the thin, cylindrical portion 2b. A plurality of bolts 12 is used to fix the housings 6a and 6b together with the flange 2a clamped therebetween. Formed on the outside peripheral surface of the output-side cylindrical housing 6b is an outward-projecting flange 6c. Screw-holes 6d are formed in the flange 6c for affixing the housing 6 to an affixing member (not shown).

The thin, cylindrical portion 2b extends around the inner peripheral surface of the output-side cylindrical housing 6b. An annular space 6e is formed between the outer peripheral surface of the cylindrical portion 2b and the inner peripheral surface of the output-side cylindrical housing 6b to permit outward radial elastic deformation of the cylindrical portion 2b.

The carrier 5 positioned concentrically within the housing 6 includes an output-side disc-shaped end plate portion 5a, and a cylindrical portion 5b that extends from the disc-shaped end plate portion 5a, concentrically with drive axis 1a, towards the input side. The disc-shaped end plate portion 5a is rotatably supported on the inner peripheral surface of the housing 6 via the output-side tapered roller bearing 8, and the input side of the cylindrical portion 5b is rotatably supported on the inner peripheral surface of the housing 6 via the input-side tapered roller bearing 7.

The sun gear 3 is inserted concentrically into the input side of the cylindrical portion 5b. The sun gear 3 has an external teeth portion 3a, and a shank 3b that extends concentrically from the input end of the external teeth portion 3a. The shank 3b is connected to the coupling 9 provided concentrically on the input side of the shank 3b. Just one end of the sun gear 3 is supported by the coupling 9, so that the external teeth portion 3a floats perpendicularly to the drive axis 1a.

The part of the cylindrical portion 5b facing the external teeth portion 3a has a space in which the planetary gears are mounted at fixed angular intervals in the peripheral direction. The planetary gears 4 are rotatably supported on a planetary shaft 4a suspended between the disc-shaped end plate portion 5a and the cylindrical portion 5b, with each of the planetary gears 4 in meshed engagement with the sun gear 3 and the internal gear 2.

The output-side configuration of the planetary gear drive 1 will now be explained. Bolts 14 are used to concentrically affix the output end of the cylindrical housing 6b to an annular flange 13. The shank 10a of a pinion 10 passes through the center hole 13a of the flange 13 and into the disc-shaped end plate portion 5a of the carrier 5, and is fixed in place by a bolt 11. An oil seal 15 is provided between the shank 10a and the flange 13.

As described above, the sun gear 3 is affixed to the coupling 9 on the input side of the planetary gear drive 1. A rotational input shaft, such as a motor output shaft, is affixed to the cylindrical input-side portion of the coupling 9. An annular flange 6f extends inwards from the inner peripheral surface of the cylindrical housing 6b. An oil seal 16 is provided between the inner peripheral surface of the flange 6f and the outer surface of the coupling 9.

The internal gear 2 used by the planetary gear drive 1 has a thin, elastically resilient constitution and the sun gear 3 floats, so that any meshing error caused by assembly error that may arise in the assembly of the gears 2, 3 and 4 is cancelled by the elastic deformation of the internal gear 2 and radial movement of the sun gear 3, automatically forming a low-backlash meshing state. Moreover, the carrier 5 is maintained by both input-side and output-side tapered roller bearings 7 and 8, which makes it possible to increase the moment capacity of the planetary gear drive 1.

Figure 2:
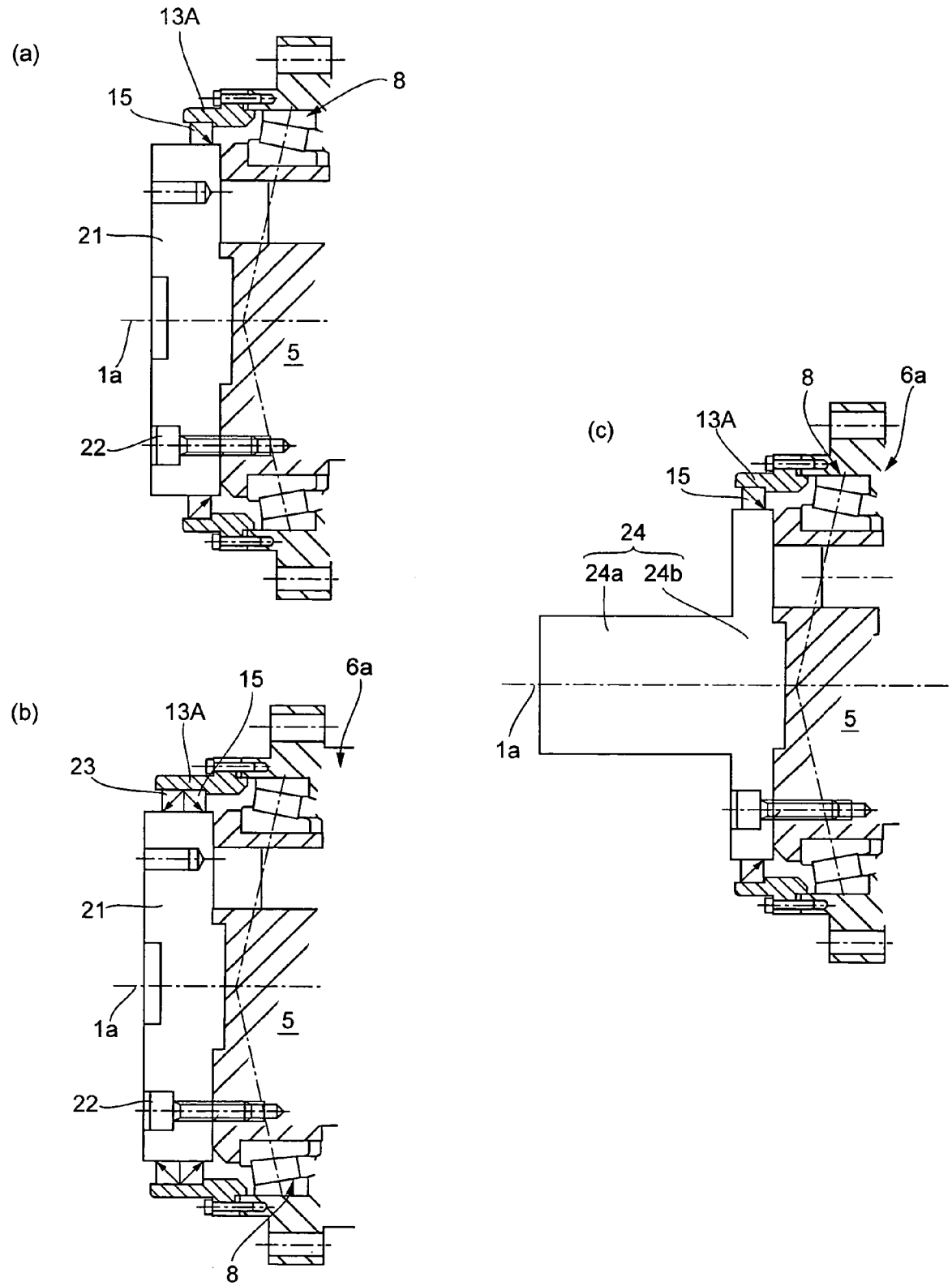
FIG. 2 shows longitudinal sectional views of examples of output-side arrangements in the planetary gear drive of FIG. 1.

Various output-side arrangements can be employed, as shown in FIG. 2. In FIG. 2(a), an annular flange 13A is affixed to the end of the cylindrical housing 6b, inside which a disc-shaped output-side flange 21 is rotatably positioned via an oil seal 15. The output-side flange 21 is fastened to the output end of the carrier 5 by bolts 22.

In the arrangement of FIG. 2(b), output-side intrusion of external foreign matter is prevented by the provision of a seal 23 on the output side of the oil seal 15 shown in FIG. 2(a). In the arrangement of FIG. 2(c), in place of the output-side flange 21, there is an output member 24 composed of an output shank 24b that extends concentrically from an output-side flange portion 24a.

Figure 3:
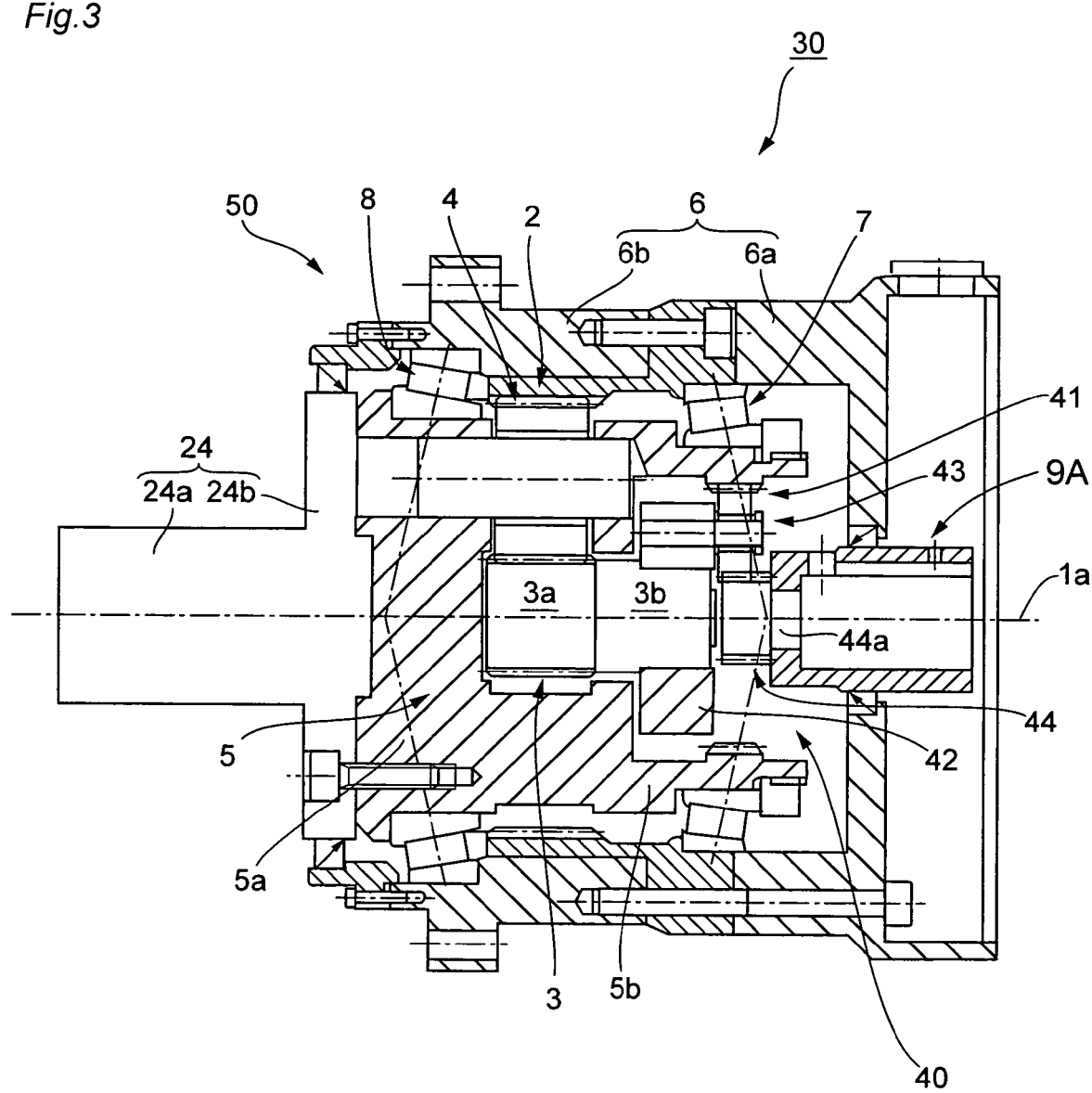
FIG. 3 is a longitudinal sectional view of a planetary gear drive according to a second embodiment of the invention.

FIG. 3 is a longitudinal sectional view of a double reduction type planetary gear drive according to a second embodiment of the invention. The planetary gear drive 30 is a two-stage type comprising a first-stage planetary gear mechanism 40 and a second-stage planetary gear mechanism 50. The structure of the second-stage planetary gear mechanism 50 is substantially the same as that of the planetary gear drive 1 of FIG. 1; the output member has the shank arrangement of FIG. 2(c).

The first-stage planetary gear mechanism 40 is located inside the input side of the carrier cylindrical portion 5b, and includes a first-stage internal gear 41 formed on the inner peripheral surface of the cylindrical portion 5b, an annular first-stage carrier 42 set concentrically onto the outer peripheral surface of the input-side shank 3b of the sun gear 3, a plurality of first-stage planetary gears 43 rotatably supported by the first-stage carrier 42, and a first-stage sun gear 44 located concentrically on the input side of the shank 3b. The first-stage planetary gears 43 are in meshed engagement with the first-stage sun gear 44 and the first-stage internal gear 41. A coupling 9A is attached to the input-side shank 44a of the first-stage sun gear 44. In this embodiment, the sun gear 3 and the first-stage sun gear 44 can both float perpendicularly to the drive axis.

As in the planetary gear drive 1 of FIG. 1, the internal gear 2 used in the second stage of the planetary gear drive 30 is a thin, elastically resilient gear, and the first-stage and second-stage sun gears 3 and 44 are maintained in a floating state that allows them to move radially. Therefore, any uneven meshing caused by error in the assembly or manufacture of the gears 2, 3, 4, 41, 43 and 44 can be adjusted by the elastic deformation of the internal gear 2 and the movement of the sun gears 3 and 44. This makes it possible to reduce backlash. Moreover, the use of two tapered roller bearings 7 and 8, gives the drive a high moment capacity.

The planetary gear drive 30 can of course use the output member arrangements shown in FIG. 1 and FIG. 2(a) and (b).

As described in the foregoing, in the planetary gear drive according to this invention, the internal gear has a thin, elastically resilient constitution, and the sun gears are able to move perpendicularly to the drive axis, and the carrier is supported by a pair of tapered roller bearings. As a result, in accordance with this invention, it is possible to achieve a planetary gear drive that has low backlash and a high moment capacity.

What is claimed is:

1. A planetary gear drive, comprising:
   an internal gear,
   a sun gear disposed concentrically within the internal gear,
   at least one planetary gear in meshed engagement with the internal gear and sun gear,
   a carrier that rotatably supports the planetary gear,
   a housing that houses the above gears and carrier, and
   an input-side tapered roller bearing and an output-side tapered roller bearing attached to an inner peripheral surface of the housing, said tapered roller bearings being positioned along a drive axis at each end of the internal gear, wherein
   the carrier has an output-side disc-shaped end plate portion and a cylindrical portion extending to an input side of the drive from the output-side disc-shaped end plate portion, the disc-shaped end plate portion of the carrier is rotatably supported on an inner peripheral surface of the housing by means of the output-side tapered roller bearing, an input-side portion of the cylindrical portion of the carrier is rotatably supported on the inner peripheral surface of the housing by means of the input-side tapered roller bearing, and the sun gear is inserted concentrically into the cylindrical portion from the input side, wherein
   the internal gear is a thin, elastically resilient internal gear capable of radial elastic deformation, and wherein
   the sun gear is incorporated in a floating state that enables it to move perpendicularly to the axis.

2. A planetary gear drive according to claim 1, further comprising a first-stage planetary gear mechanism located inside an input side of the cylindrical portion of the carrier, wherein
   the first-stage planetary gear mechanism comprises
   a first-stage internal gear formed on an inner peripheral surface of the cylindrical portion,
   a first-stage carrier set concentrically onto an outer peripheral surface of the input-side shank of the sun gear,
   at least one first-stage planetary gear rotatably supported by the first-stage carrier, and
   a first-stage sun gear located concentrically on an input side of the sun gear shank, and wherein
   the first-stage sun gear is provided in a floating state that enables the first-stage sun gear to move perpendicularly to the drive axis.

3. A planetary gear drive according to claim 1, wherein the internal gear comprises an annular flange affixed to the housing, a thin, cylindrical portion extending from the flange to an output side of the drive, and internal teeth formed on an inner peripheral surface of the thin, cylindrical portion, and wherein
   an annular space is formed between an outer peripheral surface of the cylindrical portion and the inner peripheral surface of the housing that allows outward radial elastic deformation of the thin, cylindrical portion.

4. A planetary gear drive according to claim 3, wherein the housing comprises an input-side cylindrical housing and an output-side cylindrical housing fixed concentrically together with the annular flange of the internal gear clamped therebetween.

5. A planetary gear drive according to claim 1, further comprising an annular flange affixed concentrically on an output end of the housing, an output member connected concentrically to an output end of the disc-shaped end-plate portion of the carrier, and an oil seal disposed between the annular flange and the output member.

6. A planetary gear drive according to claim 5, wherein the output member is a round output shaft, a pinion or a disc-shaped flange.

7. A planetary gear drive according to claim 6, further comprising a seal provided between the flange and the output-side member to prevent intrusion of external foreign matter.

* * * * *